United States Patent

[11] 3,602,529

| [72] | Inventor | Millard A. Derr, Jr.<br>17 Richard Court, Orinda, Calif. 94563 |
|------|----------|---|
| [21] | Appl. No. | 4,649 |
| [22] | Filed | Jan. 21, 1970 |
| [45] | Patented | Aug. 31, 1971<br>Continuation-in-part of application Ser. No. 785,536, Dec. 20, 1968, now abandoned. |

[54] ANTISWAY TRAILER HITCH
14 Claims, 12 Drawing Figs.

[52] U.S. Cl. ................................. 280/406 A, 280/446, 280/488
[51] Int. Cl. .......................................... B62d 53/00
[50] Field of Search ........................................ 280/406, 406.1, 446, 446.3, 488

[56] References Cited
UNITED STATES PATENTS

| 3,101,959 | 8/1963 | Adams | 280/446 (.3) |
| 3,191,967 | 6/1965 | Penk | 280/488 X |
| 3,353,842 | 11/1967 | Lewis | 280/447 |

FOREIGN PATENTS

| 534,775 | 12/1956 | Canada | 280/406 (.1) |
| 9,930 | 1914 | Great Britain | 280/488 |
| 149,976 | 11/1960 | U.S.S.R. | 280/488 |

Primary Examiner—Leo Friaglia
Attorney—Townsend and Townsend

ABSTRACT: A trailer hitch assembly for connecting a trailer having a trailer bar to a towing vehicle having a rearwardly extending tow bar. The tow bar is mounted to the vehicle for pivotal movement about a vertical axis and through a limited arc. The forward end of the trailer bar and the rear end of the tow bar are pivotally connected and the two bars are yieldingly biased into mutual alignment permitting pivotal movements between the trailer bar and the tow bar only after no further pivotal movements between the tow bar and the vehicle are possible.

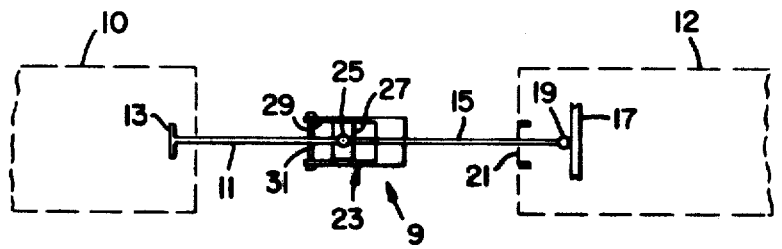
FIG_1
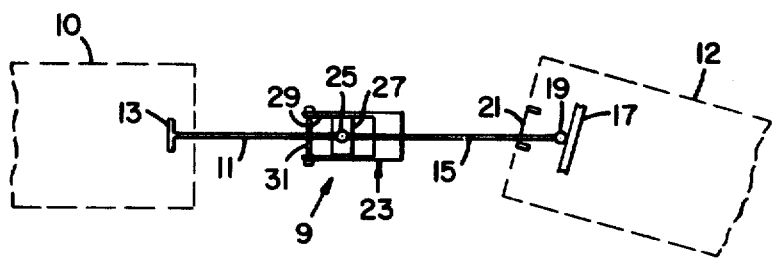
FIG_2
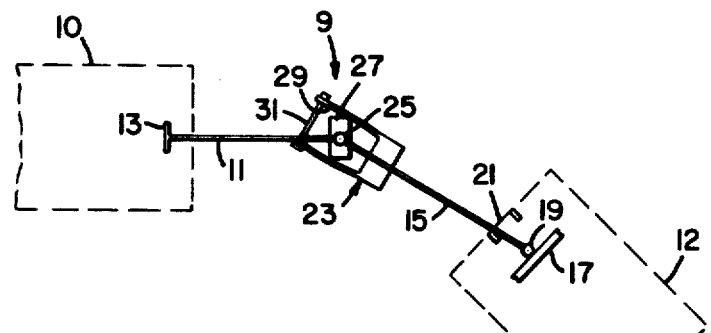
FIG_3
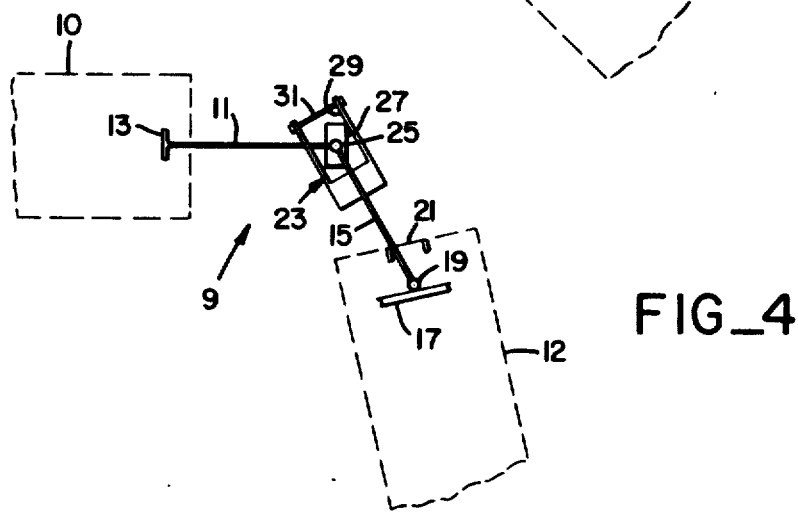
FIG_4
INVENTOR.
MILLARD A. DERR, JR.
BY
Townsend and Townsend
ATTORNEYS

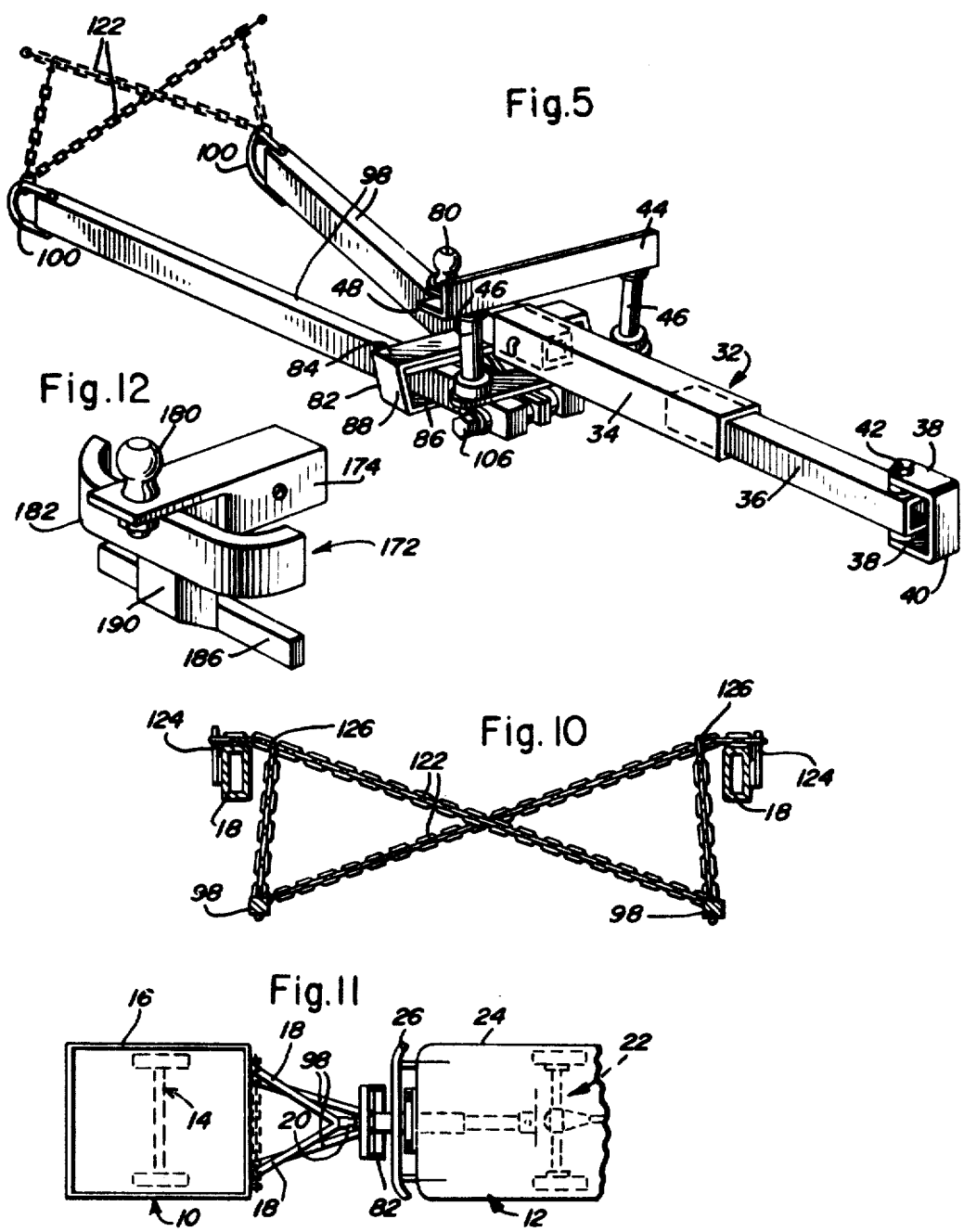

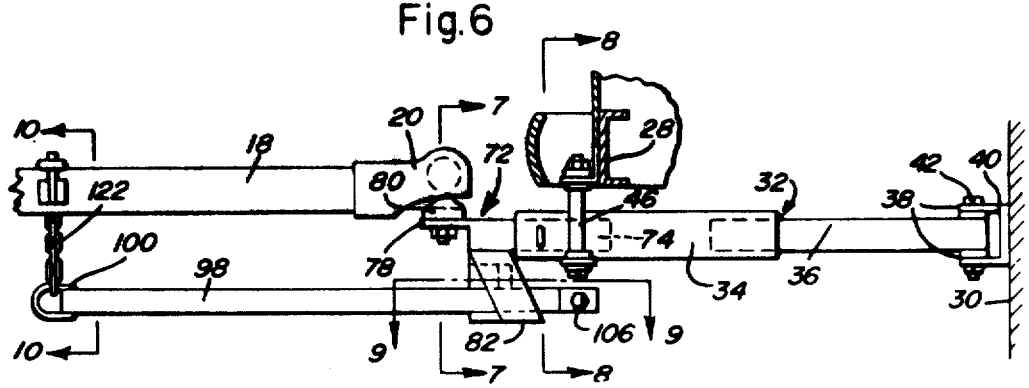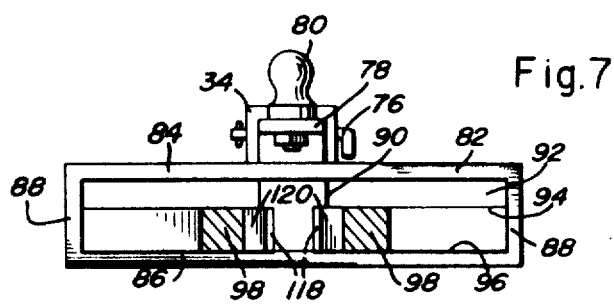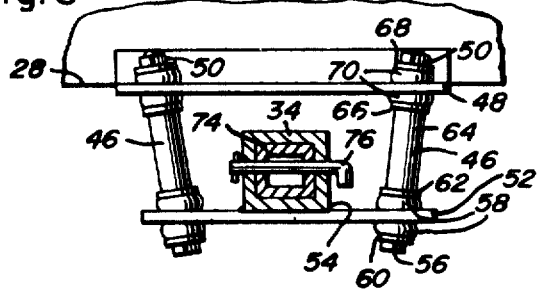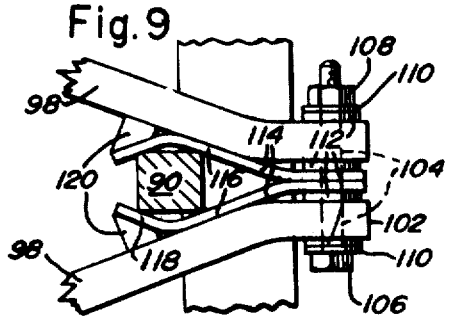

ANTISWAY TRAILER HITCH

RELATED APPLICATIONS

This application is a continuation-in-part application of the commonly owned, copending application bearing Ser. No. 785,536, filed Dec. 20, 1968 for ANTISWAY TRAILER HITCH and now abandoned.

BACKGROUND OF THE INVENTION

Prior art towing vehicle-trailer connections fall into two general classes or types. First, there are special purpose tractor-semitrailer combinations for heavy duty transport application. The forward end of the semitrailer is carried by a special structure on the tractor located over or forward of the tractor rear axle or axles. Such vehicle combinations are relatively stable even at high speeds and when subjected to significant lateral forces from side winds, crowned street surfaces and the like since lateral forces acting on the trailer are transmitted to the tractor at a point at which they are not multiplied by moment arms and thus do not sway the tractor when it moves at high speeds.

The second class of vehicle-trailer connection is usually found on passenger automobiles or small trucks and comprises a ball joint between a trailer bar extending forwardly of the trailer and a tow bar extending rearwardly of the towing vehicle. One-half of the joint, say the ball, is fixedly secured to the end of the tow bar so that the transmission of lateral forces from the trailer to the vehicle takes place at a point substantially rearward of the towing vehicle rear axle. The resulting moment arm can twist the body of the towing vehicle horizontally about the rear vehicle wheels. This swaying of the towing vehicle, particularly at high speeds, can result in loss of control of the vehicle. Once control of the vehicle has been lost, serious or even fatal accidents can and do occur.

In recognition of the difficulties encountered in trailer hitch constructions described in the preceding paragraph, attempts have been made to relocate the pivotal connection between the towing vehicle and the trailer to adjacent or vertically above the rear axle of the vehicle thus providing a means to directly transmit lateral forces through the rear axle to the pavement without twisting the body of the towing vehicle. This requires that the trailer bar be brought forward, underneath the rear end of the vehicle, e.g. the trunk, and for pivotal connection to the towing vehicle frame immediately aft of the rear axle. The adverse effects of lateral forces transmitted from the trailer to the vehicle adjacent the rear end of the vehicle are thereby substantially reduced. However, the construction is cumbersome and the trailer is difficult or almost impossible to hook up since there is usually no ready access to the pivotal connection immediately aft of the rear axle. In addition, many passenger vehicles provide little or no space for bringing the trailer bar forward to the rear axle and a tow bar designed to provide a pivot for all necessary turning maneuvers near the rear axle and disposed beneath the rear end of an automobile severely reduces the ground clearance of the vehicle. Coach work used on typical light passenger vehicles practically prevents a simple extension of the trailer bar under the vehicle to a pivot near the rear axle since the full range of turning maneuvers cannot be accommodated because vertical and horizontal clearance problems become more and more severe as provision is made for the larger horizontal deflection angles encountered in tight maneuvering at low speeds.

A further drawback of such trailer hitches is that they cannot be employed with standard, existing trailer bars since their length must almost be doubled to reach to adjacent the rear vehicle axle. Lastly, such trailer connections usually provide insufficient space to enable relative vertical oscillations between the vehicle and the trailer about a transverse horizontal axis when the vehicle and the trailer drive over crowns, through ditches, or generally over rough terrain.

As a consequence, trailer hitch constructions for passenger automobiles and small trucks not specially designed for pulling semitrailers generally continue to employ a universally movable joint located aft of the rear end of the towing vehicle. Thus, swaying of the towing vehicle, or loss of control thereover, caused by lateral forces acting at the joint continue to pose a serious road hazard.

SUMMARY OF THE INVENTION

The present invention provides a hitch assembly for connecting a trailer to a towing vehicle in which, at least at high speeds, lateral forces acting on the trailer are transferred to the vehicle closely adjacent the rear axle of the vehicle. This significantly reduces the swaying of the towing vehicle, even at high speeds while lateral forces of relatively high magnitude are transmitted from the trailer to the vehicle.

Briefly, the present invention provides a vehicle-to-trailer connection which comprises a first pivotal joint permitting relative pivotal movements of the trailer through a limited arc, a second pivotal joint permitting relative pivotal movements of the trailer, and means for releasably immobilizing the second joint in a predetermined position until the pivotal movements of the trailer about the first joint reaches a terminus of the limited arc.

The first pivotal joint is preferably disposed immediately adjacent to and aft of the rear axle of the towing vehicle and, in any event, is disposed forward of the aft end of the vehicle. Means are provided for supporting the tow bar at the aft end of the vehicle and such means preferably include the means for limiting the pivotal movements of the tow bar about the first joint. Such movement limiting means further preferably includes means for resiliently or gradually terminating the pivotal movement of the tow bar to prevent hard impacts, shock and possible adverse effects from substantial reaction forces.

The second pivotal joint is disposed aft of the rear end of the vehicle and can comprise a conventional ball joint with the ball socket mounted to a trailer bar affixed to the trailer and the ball affixed to the tow bar extending rearwardly of the vehicle. The means for releasably immobilizing the second joint comprises a detent arrangement which yieldingly biases the trailer bar and the tow bar into mutual alignment. The two bars, therefore, remain aligned as long as the tow bar can pivot about the first pivotal joint. Only after the tow bar reaches the terminus of its pivotal movement about the first joint can forces develop which cause a release of the detent so that thereafter the trailer can pivot with respect to the towing vehicle about the second pivotal joint. It is preferred that the detent means are constructed so that after the initial force biasing the trailer bar and the tow bar into alignment is overcome the force in opposition of pivotal movements between the two bars decreases to facilitate the articulation between the tow vehicle and the trailer and to prevent undue stiffness in the joint while it is movable.

The means limiting the pivotal movements is constructed so that the arc through which the tow bar can pivot about the first joint is sufficient to navigate curves that can be safely taken by vehicles travelling at a speed of about 30 m.p.h. or more. By necessity, such curves have relatively large turning radii and, therefore, result in relatively small angular deflections between the vehicle and the trailer. In instances where the vehicle navigates sharp corners, as when driving in city traffic or when backing up into driveways, parking stalls and the like, the vehicle moves relatively slow and can, therefore, prescribe small turning radii, which, in turn, result in relatively large angular deflections between the vehicle and the trailer. These large angular deflections are permitted by the second pivotal joint.

Thus, the present invention provides a trailer hitch assembly in which lateral forces acting on the trailer are transmitted to the towing vehicle closely adjacent the rear axle of the vehicle as long as the relative deflection between the vehicle and the trailer is relatively small as when the vehicle travels at high speeds. Since there is no force multiplying moment arm dangerous high-speed swaying of the towing vehicle about its rear wheels is virtually eliminated. During such times, the second pivotal connection acts as if it were rigid. Yet, the second pivotal joint can be released to conveniently disconnect the trailer from the vehicle, allows for oscillating or twisting motions between the vehicle and the trailer about a longitudinal horizontal axis and, when sharp turns must be made, becomes a temporary pivotal connection which permits any desired angular deflection between the vehicle and the trailer. In addition, the present invention can be used with conventional trailer bars and is, therefore, economical.

BRIEF DESCRIPTION OF THE DRAWINGS

FIG. 1 is a schematic plan view illustrating the trailer hitch connection of the present invention while the towing vehicle and the trailer move along a straight line;

FIG. 2 is a schematic plan view similar to FIG. 1 but illustrates the operation of the trailer hitch assembly while the vehicle and the trailer are only slightly angularly deflected and move along a slight curvature with a large radius, as, for example, when they travel at highway speeds;

FIG. 3 is a view similar to FIG. 2 but illustrates the trailer hitch when the vehicle and the trailer are substantially angularly deflected and move along a substantial curvature with a relatively small radius as when moving around street corners;

FIG. 4 is a plan view similar to FIG. 3 illustrating the trailer hitch when the vehicle and the trailer are angularly deflected by almost 90° and move along a sharply curved path, as when backing up;

FIG. 5 is a perspective view of the trailer hitch construction;

FIG. 6 is a side elevational view of the trailer hitch construction operatively associated with a trailer tongue, the rear bumper of a towing vehicle and a mounting portion on the towing vehicle disposed forwardly of the vehicle rear bumper adjacent the rear axle of the vehicle;

FIG. 7 is an enlarged transverse vertical sectional view taken substantially upon the plane indicated by section line 7—7 of FIG. 6;

FIG. 8 is an enlarged fragmentary transverse vertical sectional view taken substantially upon a plane indicated by section line 8—8 of FIG. 6;

FIG. 9 is a fragmentary enlarged horizontal sectional view taken substantially upon the plane indicated by the section line 9—9 of FIG. 6;

FIG. 10 is a vertical transverse sectional view taken substantially upon the plane indicated by section line 10—10 of FIG. 6;

FIG. 11 is a top plan view of a trailer operatively connected to the rear end portion of the towing vehicle by the hitch construction of the instant invention; and FIG. 12 is a perspective view of a modified component of the hitch constructions.

DESCRIPTION OF THE PREFERRED EMBODIMENTS

Referring to FIGS. 1 through 4, the broad concept and operation of trailer hitches constructed in accordance with the present invention is first described on hand of schematics illustrating the various operative positions of a trailer hitch assembly 9 connecting a trailer 10 to a towing vehicle 12. The trailer hitch assembly broadly comprises a trailer bar 11 which is rigidly secured to a frame member 13 of the trailer and projects past the forward end of the trailer. A vehicle tow bar 15 extends past a rear end of the vehicle and is secured to a vehicle frame member 17 by means of a vehicle connection 19 permitting pivotal movements of the tow bar with respect to the vehicle frame about a substantially vertical axis. The vehicle further includes means 21 which limit the arc through which the tow bar 15 can pivot relative to the vehicle.

A bar connection 23 couples the forward end of trailer bar 11 with the aft end of tow bar 15 and permits relative pivotal movements of the two bars about a vertical pivot axis 25. The bar connection further includes means biasing the trailer bar and the tow bar into mutual alignment and preventing relative pivotal movement between the two as long as tow bar 15 can pivot about vehicle connection 19. These means are schematically illustrated to comprise a noncircular, square or rectangular block 27 that is affixed to trailer bar 11 and a pair of resilient jaw members or leaf springs 29 that are secured to tow bar 15 and extend rearwardly past the aft end of the tow bar and block 27 where their free ends are interconnected by a suitable bolt 31 or the like. The leaf springs are laterally spaced from the center of the tow bar and the trailer bar so that they firmly engage the lateral sides of block 27 when the free spring ends are biased towards each other. Thus, the pivot limiting means maintains the tow bar and the trailer bar in mutual alignment unless a sufficient torque is applied to bar connection 23 to overcome the biasing force exerted by the leaf springs.

Hitch assembly 9 functions as follows. As long as trailer 10 and vehicle 12 are aligned, as when driving along a straight line, tow bar 15, vehicle connection 19 and bar connection 23 are in their neutral or zero positions. Lateral forces that may act on the trailer, such as forces from side winds, are transferred to the vehicle frame 17 by the vehicle connection 19 at a point forward of the aft end of the vehicle and preferably closely adjacent the rear axle (not shown in FIGS. 1 through 4) of the vehicle. If vehicle 12 turns slightly to either side, to negotiate a highway curve at substantial speeds, for example, tow bar 15 pivots about connection 19 with respect to the vehicle while pivotal connection 23 remains rigid. This pivotal movement of the tow bar can continue freely within the limits defined by limiting means 21. Thus, during all times while the vehicle moves along a straight path or negotiates large radii curves, lateral forces from the trailer are transmitted to the vehicle adjacent the latter's rear axle.

If the vehicle must make a sharp, small radius turn as when turning around a street corner which, by necessity, means a low-speed movement, the angular deflection between the trailer and the vehicle exceeds the maximum arc through which tow bar 15 can pivot. Consequently, vehicle connection 19 becomes rigid and a torque is applied to bar connection 23 which causes relative pivotal movements between the trailer and tow bars about pivot axis 25 in opposition to the force exerted by leaf springs 29 biasing the bars into alignment. The trailer and tow bars can now pivot through any desired degree, as clearly seen in FIGS. 3 and 4, to enable the negotiation of sharp corners, the backing of the vehicle and the trailer, and the like.

From the moment the bars are angularly inclined with respect to each other lateral forces from the trailer are transmitted to the vehicle via pivot limiting means 21 disposed adjacent the aft end of the vehicle. However, since such substantial deflections can only take place when the vehicle and the trailer move at low speeds, dangerous veering or swaying of the vehicle and possible loss of control thereover do not occur since these are high-speed phenomena. It is therefore apparent that trailer hitch assemblies constructed in accordance with the present invention provide for a first, high-speed pivotal trailer connection adjacent the rear axle of the towing vehicle so that lateral forces from the trailer are transmitted to the vehicle closely adjacent the rear axle thereof. A second, low-speed, sharp turning radius pivotal connection is immobilized during high-speed movements of the vehicle, and permits large relative angular deflections of the vehicle and the trailer during low-speed maneuvers.

Once the angular deflections of the vehicle and the trailer cause pivotal movements about pivot 25 and particularly when the angular inclination is relatively large, as illustrated in FIG. 4, for example, it is desirable to limit the maximum force exerted by leaf springs 29 in opposition to such pivotal movement, or to even decrease such force. This can be accomplished, for example, by constructing block 27 so that it has a rectangular shape and its lateral sides are relatively short as compared to its forward and aft sides so that the spacing between the leaf springs increases only temporarily, say to the position the trailer and vehicle are shown in FIG. 3, and thereafter remains constant or even decreases, as illustrated in FIG. 4.

Referring now to FIGS. 5 to 11 more specific embodiments of the invention are shown and described. Numeral 10 generally designates a conventional form of trailer and the numeral 12 generally designates a conventional form of towing vehicle. The trailer 10 includes a main frame (not shown in FIGS. 5–11) from which running gear referred to in general by the reference numeral 14 is supported and a body 16 is mounted on the frame. In addition, a pair of forwardly convergent arms 18 are secured at their rear ends to the forward end of the trailer frame and joined together at their forward end by means of a socket hitch element 20. The arms 18 and element 20 define a trailer bar. The vehicle 12 includes a main frame (not shown in FIGS. 5–11) from which a suitable rear axle assembly referred to in general by the reference numeral 22 is spring mounted and the vehicle 12 includes a body 24 also supported from the frame. A rear transversely extending bumper assembly 26 is supported at the rear of the vehicle 12 and the main frame of the vehicle 12 includes a rear transverse member 28 from which the bumper assembly 26 is supported. Also, the vehicle 12 includes a frame or body portion 30 spaced rearward from but adjacent the axle assembly 22.

The entire trailer hitch assembly of the instant invention provided for coupling the trailer 10 to the rear of the vehicle 12 includes the arms 18 and the socket element 20 but it is to be appreciated that these components are found on substantially all trailers of the type to which the invention pertains and therefore that the invention may be readily practiced in conjunction with existing trailers merely by adding certain components of the trailer hitch assembly to the conventional trailer tongue including the arms 18 and the socket element 20, even though it may be necessary to add elements such as portion 30 and/or member 28 to certain types of tow vehicles.

The trailer hitch defines an elongated tongue construction consisting of opposite end sections with the arms 18 and the element 20 comprising the rear end section of the trailer bar. The front end section of the trailer tongue construction of the two bar constitutes an elongated bar assembly referred to in general by the reference numeral 32. The assembly 32 includes opposite end large and small diameter tubular members 34 and 36 with the adjacent ends of the tubular members telescopically engaged and secured together. The forward end of the member 36 is pivotally supported between the vertically spaced furcations 38 of a bifurcated mount 40 by means of a pivot pin 42. The mount 40 is secured to the frame or body portion 30 in any convenient manner and accordingly, it may be seen that the bar assembly 32 is pivotally supported from the mount 40 for horizontal swinging movement of the rear end of the bar assembly relative to the vehicle 12.

The trailer hitch construction also includes an angle iron 44 which is secured to the rear transverse member 28 of the vehicle frame in any convenient manner and a pair of upstanding support posts 46 whose upper ends are secured through the horizontal flange 48 of the angle iron 44 by means of fasteners 50. The lower ends of the support posts 46 are secured through the opposite ends of a horizontal transverse support plate 52 and the rear ends of the rear section 34 of the bar assembly 32 is secured to the horizontal support or plate 52 in any convenient manner such as by welding 54 between the lower ends of the supports 46. Alternatively, the bar assembly may be permitted to slide over the upper surface of support plate 52 between the limits formed by support posts 46.

Each of the supports 46 comprises an elongated bolt 56 having resilient sleeves 58 disposed thereon on opposite sides of the horizontal support 52 and with a washer 60 disposed between the lower resilient sleeves 58 and the head of the bolt 56. A second washer 62 is disposed above the uppermost resilient sleeve 58 and a spacer pipe 64 is disposed about the bolt 56 above the washer 62. A pair of washers 66 and 68 and a pair of resilient sleeves 70 are disposed about the upper end of each bolt 56 and correspond to the resilient sleeves 58 and washers 60 and 62. The resilient sleeves 70 are disposed on opposite sides of the horizontal flange 48 and in this manner the horizontal support 52 is resiliently supported from the flange 48. When bar assembly 32 is fixed to support plate 52 the bar assembly can move sideways a limited amount due to the resilient mounting of the plate. If the bar assembly is free to move over the support plate, its lateral movement is limited by its engagement with support posts 46. In any event, however, the resilient mounting of the support post and/or the support plate prevents sudden stops and resulting impact forces at the limits of the lateral movements of the bar assembly.

The trailer hitch also includes a head assembly referred to in general by the reference numeral 72. The head assembly 72 defines an elongated horizontal bar portion 74 which is removably telescoped in the rear end of the section 34 and secured in position by means of a removable pin 76 secured through the section 34 and the bar portion 74. The rear end of the bar portion 74 includes a rearwardly directed horizontal flange 78 from which a ball hitch element 80 is supported. Also, the rear end of the bar portion 74 includes a transversely extending upstanding frame 82 including upper and lower horizontal members 84 and 86 interconnected at corresponding ends by opposite end upstanding sides 88. A vertically short upstanding headpost 90 is secured to and extends between the horizontal members 84 and 86 and a spacer bar 92 is secured to and extends along the under surface of the upper horizontal member 84 and includes a lower surface 94 which defines a bearing surface, that opposes the bearing surface 96 defined by the upper surface of the lower horizontal member 86.

A pair of horizontal and forwardly convergent torque arms 98 are provided and are substantially identical in configuration except for being left and right handed. The rear ends of the torque arms 98 have heavy-duty anchoring eyes 100 secured thereto and the forward ends of the torque arms include generally parallel angulated terminal ends 102 provided with aligned bores 104. The torque arms 98 are constructed of stiff but resilient material such as spring steel and the forward ends thereof are clamped together by means of a bolt 106 and a nut 108 with a pair of rigid washers 110 and four resilient washers 112 being disposed on the bolt 106 as can best be seen from FIG. 5 of the drawings.

A pair of right- and left-handed spring and cam arms 114 have their forward ends clamped together between the center resilient washers 112 on the bolt 106 and include rearwardly divergent end portions 116 which terminate rearwardly in rearwardly convergent terminal ends 118. Further, the terminal ends 118 of the spring or cam arms or bars 114 are braced from the torsion or spring arms 98 by means of inserts 120 extending between the terminal ends 118 and the adjacent portions of the torque arms 98.

A detent socket is defined between the rear end portions of the arms or bars 114 through which the headpost 90 extends. The headpost 90 is substantially square in horizontal cross-sectional shape and the bolt 106 serves to tightly clamp the headpost 90 in the position thereof illustrated in FIG. 5 of the drawings against angulation about a vertical axis extending through the center of the headpost 90 relative to the torque arms 98. However, if sufficient torsional forces are applied, the torque arms 98 may be oscillated relative to the headpost 90 about its longitudinal center axis as will be hereinafter more fully set forth.

A pair of link chains 122 have one pair of corresponding ends secured to the anchor pins 124 carried by the rear ends of the arms 18 and the free ends of the chains 122 are secured to the opposite anchor eyes 100 and are then directed upwardly for securement to the other link chains as at 126. Any suitable means may be utilized to jack the rear ends of the torque arms 98 upwardly toward the rear ends of the arms 18 before attaching the link chains 122 in the manner illustrated in FIG. 6.

In FIG. 12 of the drawings there may be seen a modified form of head assembly referred to in general by the reference numeral 172 and which may be utilized in lieu of the head assembly 72. The head assembly 172 includes a bar or tubular portion 174 corresponding to the portion 74, a ball hitch element 180 corresponding to the element 80 and a depending headpost 190 corresponding to the headpost 90. Further, the head assembly 172 additionally includes an upper transverse member 182 and a lower transverse member 186 which correspond to the upper and lower horizontal members 84 and 86. Of course, the undersurface of the transverse member 182 defines a bearing surface corresponding to the lower surface 94 and the upper surface of the transverse member 186 defines a bearing surface corresponding to bearing surface 96.

In operation, the bar assembly 32 is supported from the frame or body portion 30 and rear transverse member 28 of the vehicle 12 in the manner hereinbefore set forth. Then, the assemblage comprising the head assembly and the torque arms 98 may be removably coupled to the rear end of the section 34 and secured in position by means of the pin 76. Thereafter, the socket element 20 of the trailer 10 may be engaged with the ball element 80 and the rear ends of the torsion bars or arms 98 may be jacked up toward the rear ends of the arms 18 and secured in raised position by means of the chain section 122. Of course, the spring or torque arms 98 tend to transfer a portion of the weight of the trailer supported by the arms 18 to the forward portion of the vehicle 12. Under normal operating conditions when the vehicle 12 and trailer 10 are travelling over highways at relatively high speeds, say at speeds in excess of 30 m.p.h., slight angular displacement of the vehicle 12 and the trailer 10 is accomplished by the front end of the section 30 pivoting through a limited arc relative to the bifurcated member 40 and vehicle 12. The support posts 46 resiliently swing as the rear end of the bar assembly 32 oscillates laterally relative to the rear of the vehicle 12.

The resilient mounting of support plate 52 and the resulting limited lateral mobility of bar assembly 32 is such that during all angular displacement of the vehicle and the trailer at speeds above 30 m.p.h. the angular displacement results in pivotal movements about pivot pin 42 while the ball connection 20, 80, convergent trailer arms 18 and bar assembly 32 remain stationary and linearly aligned.

Greater angular displacement of the trailer 10 relative to the vehicle 12, such as when making sharp street corner turns at low speeds or while backing, cause relative pivotal movements between arms 18 and bar assembly 32 about ball point 20, 80. These pivotal movements also cause displacements between the forward ends of the spring or torsion arms 98 and the headpost 90 in opposition to the spring force between the headpost, the torsion arms 98 and cam bars 114.

The connection defined by the arms or bars 114 between the forward ends of the bars 98 and the post 90 establishes a detent pivot connection between the forward ends of the arms 98 and the head assembly 82 with the clamping action of the rear ends of the arms 114 on the headpost 90 tending to prevent any horizontal oscillation between the trailer 10 and the vehicle 12, except at the pivot connection 42, and biasing trailer arms 18 and bar assembly 32 into mutual alignment. Thus, when the vehicle 12 and trailer 10 are travelling over the highway at a substantial speed all horizontal oscillations of the trailer 10 relative to the vehicle 12 will be through the pivot connection 42. Of course, any lateral forces acting upon the trailer 10 such as a side wind, centrifugal forces in a turn or gravity forces due to a high crown road will be transmitted to the vehicle 12 at the pivot connection 42 which is spaced only slightly rearward of the transverse centerline of the rear axle assembly 22. Thus, these lateral forces acting upon the trailer 10 will not be transferred to the vehicle 12 at its extreme rear portion and will thus have less tendency to cause the vehicle 12 to veer from side to side.

The slight downward convergence relationship of the supports 46 enables the rear end of the section 34 to oscillate slightly in a horizontal plane and causes the rear end of the section 34 to yieldingly urged toward a centered position. Thus, should the vehicle 12 have its brakes applied either while moving straight ahead or in turn any tendency of the elongated connection between the trailer 10 and the vehicle 12 established by the arms 18 and 98 and the bar assembly 32 to buckle in the middle by lateral shifting of the rear end of the section 34 will be resisted.

I claim:

1. A vehicle to trailer connection for minimizing trailer oscillations comprising: a first pivotal joint permitting free relative pivotal movements of the trailer about a substantially vertical axis, means limiting pivotal movements about the first joint to a predetermined arc, a second pivotal joint permitting relative pivotal movement of the trailer, and means for releasably immobilizing the second joint in a predetermined position until the pivotal movements of the trailer about the first joint reach a terminus of the predetermined arc.

2. A vehicle-to-trailer connection according to claim 1 wherein the vehicle includes a rear axle and the first joint is disposed adjacent the rear axle.

3. In a towing vehicle and trailer combination having a trailer bar pivotally connected to a vehicle tow bar the improvement comprising: a pivotal connection with a substantially vertical pivot axis between the tow bar and the vehicle, means limiting the pivotal movement between the tow bar and the vehicle, to a predetermined arc and means for biasing the tow bar and the trailer bar into alignment.

4. A hitch assembly for connecting a towing vehicle to a trailer comprising: a tow bar, a trailer bar, means for pivotally connecting the tow bar and the trailer bar and permitting pivotal movements about a substantially vertical axis between the bars through a relatively large angle, means for pivotally connecting the tow bar to the vehicle adjacent a rear axle thereof for pivotal movements of the tow bar about a substantially vertical axis, means operatively connected to the tow bar and the vehicle for limiting the pivotal movement of the tow bar with respect to the vehicle to a relatively small angle, and spring means for biasing the tow bar and the trailer bar into mutual alignment.

5. A hitch assembly according to claim 4 wherein the limiting means comprises means for supporting the tow bar at a point spaced from the means connecting the tow bar and the vehicle and permitting limited horizontal transverse movements of the tow bar in both directions from a center position, and means yieldingly resisting the transverse movements of the tow bar from the center position.

6. Apparatus for connecting a trailer to a towing vehicle comprising: elongate bar means for connection to the trailer and the vehicle, first pivot means connecting the bar means to the vehicle and permitting pivotal movement of the bar means relative to the vehicle about a vertical axis, second pivot means permitting relative pivotal movements between the trailer and at least a portion of the bar means about a vertical axis, means releasably biasing the trailer into alignment with the portion of the bar means, and means for applying a force in opposition to the biasing means to the second pivot means after pivotal movements of the bar means about the first pivot means through a predetermined arc to thereby cause pivotal movements about the second pivot means.

7. Apparatus according to claim 6 wherein the second pivot means is disposed between ends of the bar means.

8. Apparatus according to claim 6 wherein the biasing means includes means for reducing the force biasing the trailer and the bar means into alignment after a predetermined angular deflection of the trailer and the bar means about the second pivot means.

9. Apparatus for connecting a trailer including a forwardly projecting trailer bar and a towing vehicle having a rear extremity comprising first pivot joint means defining a forward pivotal connection between a vehicle tow bar and a mounting portion of the vehicle spaced forwardly of the rear extremity, second pivot joint means defining a rear pivotal connection between the trailer bar and the tow bar, the first means including means permitting only slight substantially horizontal angular displacement of the tow bar relative to the vehicle at the forward pivotal connection, the second means including means permitting greater horizontal angular displacement of the trailer bar relative to the vehicle at the rear pivotal connection, and means defining a detent connection yieldingly and releasably retaining the trailer bar in a generally centered position of oscillation at the rear pivotal connection with respect to the tow bar.

10. The combination of claim 9 wherein the first and second pivot defining means include means operative to transfer a portion of the weight of the trailer supported at the forward end of the trailer bar to the forward end of the vehicle.

11. Apparatus according to claim 9 wherein the detent defining means comprises a pair of opposing jaw members yieldingly clamped together and supported from one of the bars, and an upstanding post of noncircular cross section disposed between the jaw members and mounted to the other one of the bars.

12. Apparatus according to claim 9 herein the detent defining means includes means for varying the effective torsional force required to horizontally angularly displace the trailer bar relative to the tow bar.

13. Apparatus according to claim 11 wherein the second means comprises coacting ball and socket members carried by the trailer bar and the tow bar.

14. Apparatus according to claim 9 wherein the trailer bar includes an elongated rigid tongue construction, the detent means includes a pair of opposing jaw members yieldingly clamped together and supported from the tongue for oscillation therewith, the detent means also including an upstanding post of noncircular cross section disposed between the jaw members and supported from a rear end of the tow bar, the jaw members being carried by a forward end of a pair of load transferring spring arms extending longitudinally of the tongue construction, the forward ends of the spring arms being supported from the rear end of the tow bar.